United States Patent

Bader

[15] 3,648,033

[45] Mar. 7, 1972

[54] DEVICE FOR CONTROLLING THE FUEL SUPPLY WITH PROPELLER TURBOJET ENGINES FOR AIRCRAFT BY MEANS OF A THROTTLE LEVER AND A TRIMMING LEVER

[72] Inventor: Gottfried Bader, Uberlingen, Bodensee, Germany

[73] Assignee: Bodenseewerk Geratetechnik GmbH, Uberlingen, Bodensee, Germany

[22] Filed: Apr. 17, 1970

[21] Appl. No.: 29,489

[30] Foreign Application Priority Data

Apr. 19, 1969 Germany ...................P 19 20 002.3

[52] U.S. Cl. .........................................235/150.21, 60/39.28
[51] Int. Cl. ....................................................F02c 9/04
[58] Field of Search ............................235/150.21; 60/39.28

[56] References Cited

UNITED STATES PATENTS

3,357,177  12/1967  Cornett..................................60/39.28
3,482,396  12/1969  Nelson et al. ..........................60/39.28
3,472,027  10/1969  Snow et al........................60/39.28 X
3,469,395  9/1969   Spitsbergen et al....................60/39.28
2,701,111  2/1955   Schuck .........................235/150.21 X

Primary Examiner—Malcolm A. Morrison
Assistant Examiner—Edward J. Wise
Attorney—Darbo, Robertson & Vandenburgh

[57] ABSTRACT

A plurality of input signals are fed to a computer which determines a "set" signal indicative of a desirable turbine gas temperature of the turbojet engine. The input signals include information as to the engine speed and the air pressure at the altitude at which the engine is operating. An "actual" signal is derived indicative of the existing turbine gas temperature and is compared with the "set" signal to produce an error signal. From the error signal indications are given to the pilot as to the movement required of the trimming lever to achieve the desirable turbine gas temperature for the conditions under which the engine is operating. The error signal can be used for automatic correction of the setting of the trimming lever.

14 Claims, 16 Drawing Figures

INVENTOR:
GOTTFRIED BADER

DEVICE FOR CONTROLLING THE FUEL SUPPLY WITH PROPELLER TURBOJET ENGINES FOR AIRCRAFT BY MEANS OF A THROTTLE LEVER AND A TRIMMING LEVER

BACKGROUND AND SUMMARY OF THE INVENTION

This invention relates to a device for controlling or automatically controlling the fuel supply with propeller turbojet engines for aircraft by means of a throttle lever and a trimming lever.

Turbo engines are known to comprise an air inlet at the front and behind which is a compressor. The compressor causes a compression of the incoming air to a relatively high pressure. The compressed air enters into one or several combustion chambers into which fuel is injected. The air-fuel mixture is burned in the combustion chamber, thereby generating an extremely hot gas mass which is discharged through a turbine and a thrust nozzle. The turbine is driven and abstracts part of the energy of the gas mass therefrom. The turbine is coupled to the compressor through a connection shaft. In propeller turbojet engines a relatively large proportion of the energy of the hot gas mass is converted into mechanical work by the turbine, and the turbine drives a propeller as well as the compressor. In such jet engines, the first temperature rise of the air takes place in the compressor in which also a pressure rise to a maximum value takes place. In the combustion chamber the pressure decreases from the maximum value, while the temperature rises to a maximum value which substantially occurs at the entrance of the turbine. In the turbine, the hot gas mass cools off to a certain extent, wherein the gas performs work. According to the second law of the theory of heat, the higher the maximum temperature at the entrance of the turbine, the greater the mechanical power output. This temperature is termed turbine gas temperature.

On the one hand, the turbine gas temperature should be as high as possible for the reasons as described. While on the other hand, the turbine gas temperature should not exceed specific limits in order to avoid the danger of destruction of the engine. The respective optimum value for the turbine gas temperature depends on the mode of operation (takeoff, cruising range, no-load cruising, ground run, reversion) and the engine speed, as well as on the environmental conditions such as cruising altitude, air temperature and air speed.

Two control elements, a throttle lever and a trimming lever are provided for controlling such a jet engine. Depending on the selected mode of operation, the throttle lever is effective to preestablish a speed and a specific fuel flow which is so adapted that the required power output is achieved, without exceeding the temperature limit values of the turbine. The fuel flow is automatically controlled in that a constant differential pressure is maintained at a throttle, the cross-sectional area of which can be adjusted by the throttle lever. With a change in this differential pressure, the stroke of a fuel pump is varied. The fuel flow is automatically corrected with changes in the air throughput due to pressure changes at the air entrance, when altitude and speed change. The trimming lever is effective to correct the fuel flow in dependence on the air inlet temperature and the altitude, thereby to attain a preestablished value of the turbine gas temperature which in turn depends on the mode of operation, and thus, on the position of the throttle lever.

Thus, the maximum permissible turbine gas temperature depends on the engine speed as it is preestablished by the throttle lever, as well as on the cruising altitude and the air pressure, respectively. In order to obtain the turbine gas temperature, a specific position of the trimming lever must be selected in dependence on the air temperature. Generally, this position of the trimming lever is derived from tables. This determination and adjustment of the trimming lever represents a considerable strain on the human pilot and involves the danger of error. In the most favorable case such error may lead to the unavailability of full engine performance, and in the most unfavorable case it can result in a destruction of the engine due to excessive engine temperatures.

It is an object of this invention to simplify this laborious determination of the trimming lever adjustment required for the respective mode of operation and the respective environmental conditions and provide automation for the same.

The device, according to the invention, is characterized by a computer controlled by the speed, air pressure or cruising altitude, and may be the position of the throttle lever or these data and the air temperature, for determining a setpoint value for the turbine gas temperature of the engine and for the position of the trimming lever determining the turbine gas temperature, respectively, a measuring sensor for measuring the actual value of the turbine gas temperature and the position of the trimming lever, respectively, and a device for generating an error signal, if the actual value deviates from the setpoint value thus calculated.

According to one embodiment of the invention, the turbine gas temperature is directly measured. The setpoint value of the turbine gas temperature established for the respective mode of operation is calculated automatically by a computer. An error signal is generated in response to deviations between the actual value and setpoint value. This error signal can control an automatic lever control or an indicating device. An indicating device could comprise two blinking lamps with one being actuated in dependence on the sign of the deviation. When the one, or the other, blinking lamp lights up, the human pilot may cause the error signal to disappear by manual actuation of the trimming lever.

In another embodiment of the invention, the position of the trimming lever, which position is required for the desired turbine gas temperature, is used as the input to the computer instead of using the turbine gas temperature of the engine as the input. Thus, a measuring sensor measures the actual value of the trimming lever position. An indication may be initiated accordingly, by an error signal, or an automatic control may be effected. In addition to the aforesaid data, the computer must be controlled by a signal representing the air temperature in order to calculate the setpoint value for the position of the trimming lever.

The computer may include a function transmitter for forming a first signal proportion as a function of engine speed, as well as an adding amplifier for imposition of the said first signal proportion by a second signal proportion dependent on the air pressure (or the cruising altitude). When calculating a setpoint value for the position of the trimming lever, the output of the adding amplifier is additionally supplied to a multiplier element in which a multiplication by an air temperature signal is effected for forming the trimming lever setpoint value. The function transmitter may be a network in well-known manner comprising a parallel circuit of differently biased diodes, constituting a double pole, the current-voltage characteristic of which behaves analogously to a preestablished (in this case empirically) function. By way of example, the design of such a function transmitter is described in the article by Donaubauer, Lucius and Negele "Rechenverstarker" (calculating amplifier) in the periodical ELEKTRONIK 1966, volume 8, page 249 et seq.

Moreover, the measurement of the turbine gas temperature as actual value of the actual value-setpoint value comparison, according to the invention, makes it possible to provide a limit switch controlled by the actual value of the turbine gas temperature by which, when a maximum permissible turbine gas temperature is exceeded, a warning signal and/or a command can be initiated for the automatic return of the trimming lever.

To avoid erroneous manipulations in case of failure of any elements of the control chain, several parallel channels are provided for calculating the setpoint values of the turbine gas temperature, the output signals of the various channels being supplied to one or several comparison devices. The comparison devices initiate an alarm signal in case of deviation of the setpoint values calculated in the various channels.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
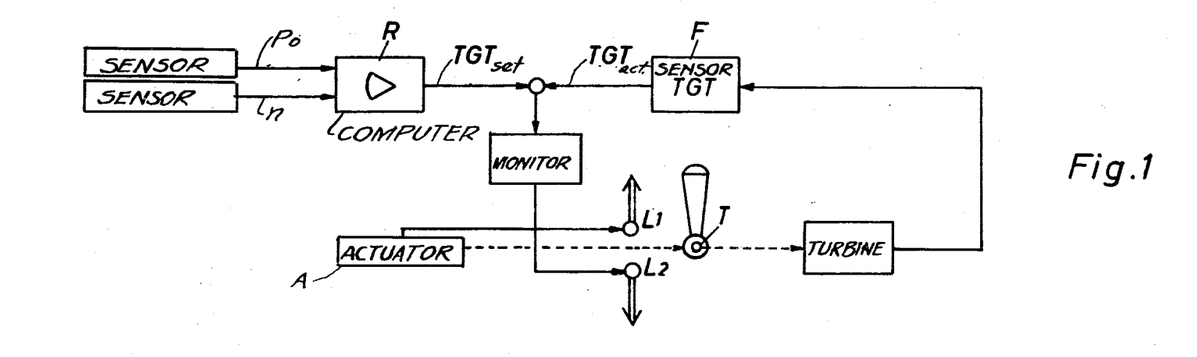
FIG. 1 is a schematic diagram illustrating the principle of one embodiment of the invention.

In the arrangement according to FIG. 1, the air pressure $p_o$ and the engine speed $n$ are supplied to a computer R. Therefrom the computer R calculates the setpoint value of the turbine gas temperature $TGT_{set}$. An actual value $TGT_{act.}$ of the turbine gas temperature is derived from the turbine by means of a sensor F. Setpoint value and actual value are compared in a monitor. When a deviation occurs, either the lamp L1 or the lamp L2 lights up depending upon whether the deviation is plus or minus. The trimming lever T which in turn influences the turbine gas temperature may be adjusted in dependence thereon. The monitor and the lights comprise a responsive means which could also include the actuator A for automatically operating the lever T.

Figure 2:
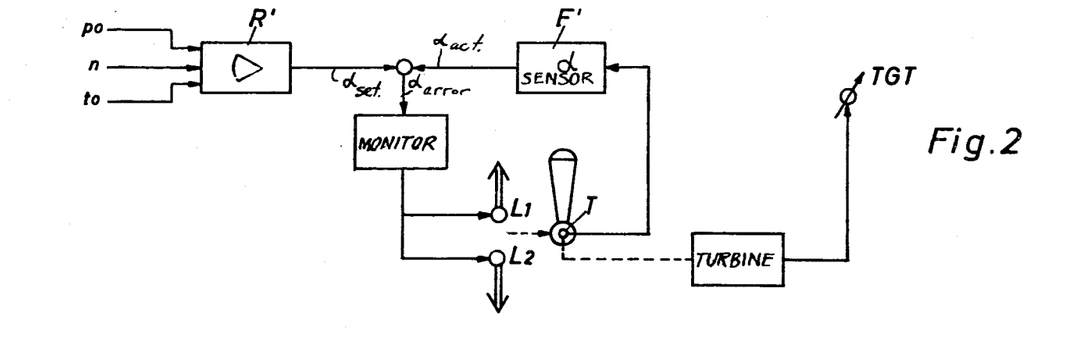
FIG. 2 illustrates a second embodiment in which the position of the trimming lever is the regulating variable.

With the control principle according to FIG. 2, signals according to the air pressure $p_o$ and speed $n$ and an additional signal in response to the air temperature $t_o$ are supplied to a computer R'. From these the computer R' calculates a setpoint value ($\alpha_{set}$) of the position of the trimming lever. The position of the trimming lever T is picked off by a sensor F' which supplies an actual value ($\alpha_{act}$) for the position of the trimming lever. The two values control a monitor which, when a deviation of actual value and setpoint value occurs, causes a lamp L1 or L2 to light up, depending on the sign of the deviation. Accordingly, the trimming lever T is adjusted. With the adjustment of the trimming lever T the turbine gas temperature (TGT) is influenced in an open circuit.

By way of example, the invention is applicable to the Rolls Royce engine "Tyne" MK 21 and MK 22, as it is described in the operating and maintenance manual "Tyne" MK 21/22 of MAN-Turbo, Munich.

Figure 3:
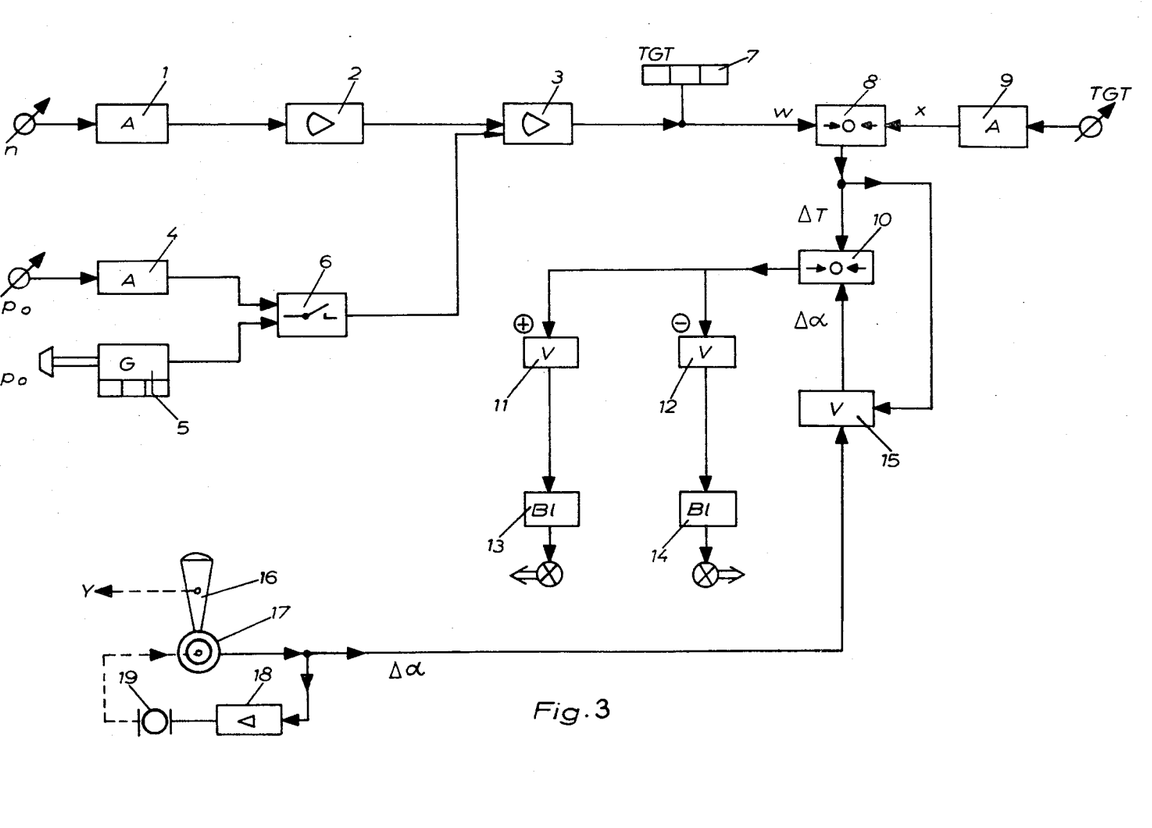
FIG. 3 is a block circuit diagram of a control chain for the cruising range.

Referring to FIG. 3, the turbine speed $n$ is derived through an adapter element 1 and processed in a computing element 2 in the form of a function transmitter. A first signal proportion is developed at the output of the function transmitter 2, which represents the setpoint value of the desired turbine gas temperature for the speed $n$ of operation, however, without considering the altitude pressure. This value of the turbine gas temperature is corrected in a computing element 3 (actually an adding amplifier), in accordance with the altitude pressure. For this purpose, a signal representative of the static pressure $p_o$ is derived from a transmitter (already existing on the aircraft) through an adapter element 4 and is applied to the adding amplifier 3.

A signal transmitter 5 is provided at which the static pressure can be established according to the altimeter reading. Through a switch 6 the one or the other pressure signals are alternatively applied to amplifier 3. At the output of the adding amplifier 3, a signal $w$ representing the setpoint value of the desired turbine gas temperature is obtained for the speed $n$ (already established) and the static pressure $p_o$. This setpoint value of the turbine gas temperature may be indicated at a digital indicating device 7 for control purposes.

This setpoint value $w$ of the turbine gas temperature is compared by a summation element 8 with a signal $x$ representing the actual value of the turbine gas temperature which is derived from a measuring sensor through an adapter element 9. The error signal or the deviation actuates the electrical valves 11 and 12 through a summation element 10. Depending upon the direction of error, one or the other of blinking devices 13 or 14 is thereby actuated to cause the light connected to the respective blinking device to flash on and off. The human pilot carries out a control movement with a trimming lever 16 until the blinking signal is extinguished. Therefore, he is in a position to adjust the trimming lever into a position called for by the present flight conditions without computing operations and without having recourse to a table.

Since the engine responds to an adjustment of the trimming lever by a time constant, a gentle "feedback" adapted to the time constant of the engine is provided. A transmitter 17 is connected with the trimming lever, which at the moment of adjustment of the trimming lever supplies a signal $\Delta\alpha$ proportional to the angular adjustment to a summation element 10 through an electrical valve 15, this signal being connected in opposition to the deviation signal $\Delta T$. If the angle signal from the transmitter 17 corresponds to the magnitude required for compensating the deviation, then the output signal of the summation element 10 is zero. Therefore, the blinking ceases. If, however, the trimming lever is adjusted too far, then a counter signal is immediately supplied by actuation of the corresponding electrical valve 11 or 12.

With a fading of the deviation signals $\Delta T$ provision is made through an electrical valve 15 for the signal across the summation element 10 to fade accordingly. With a correct adjustment of the trimming lever the output signal of the summation element 10 therefore continues to be zero.

Moreover, a followup circuit is provided which comprises an amplifier 18 controlled by the angle signal $\Delta\alpha$ and a followup motor 19 by which the stator of the synchro 17 can be caused to follow the rotor connected with the trimming lever 16. This followup circuit has its time constant adapted to the time constant of the engine so that the synchro signal $\Delta\alpha$ is weakened approximately with the time constant of the engine.

Figure 4:
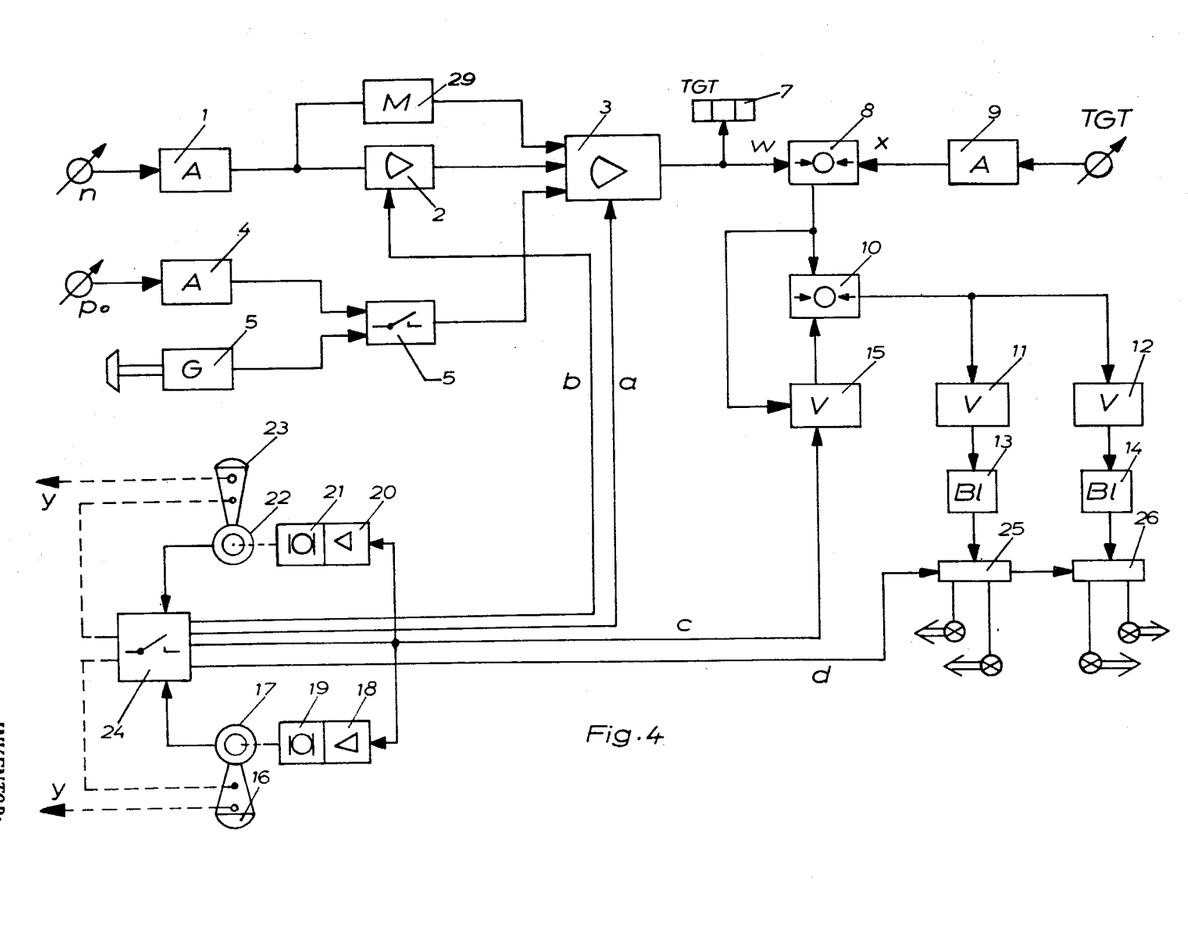
FIG. 4 is a block circuit diagram of a control chain for the whole operating range.

FIG. 4 illustrates the block circuit diagram of a control chain which is designed for the whole operating range. The design is similar to that of FIG. 3, and like parts are referenced by the same reference numerals as in that Figure. However, the following differences exist:

Above a given speed and with different modes of operation an adjustment of the trimming lever no longer has any influence on the turbine gas temperature. A switch 24 is provided for this purpose. From this switch signals are derived for specific positions of trimming lever 16 and throttle lever 23 which partly effect a changeover to another control element, namely from control by the trimming lever 16 to control through the throttle lever 23, and partly influence the computation of the setpoint value of the turbine gas temperature in the computer. These are the following switch signals:

Switch signal *a* suppresses the influence of the barometric pressure $p_o$ on the setpoint value of the turbine gas temperature determined in the computer.

Switch signal *b* preestablishes a setpoint value of the turbine gas temperature which is independent of the speed, thus is not derived from the speed but only from the position of the throttle lever.

Switch signal *c* is an angularly proportional feedback signal corresponding to $\Delta\alpha$, which, however, indicates either the position of the trimming lever or the position of the throttle lever, depending on the mode of operation. For the trimming lever 16 and the throttle lever 23 one followup circuit each is provided which is formed of the amplifier 18 and the servomotor 19 in the case of the trimming lever according to FIG. 1. The position signal from the throttle lever is supplied by a transmitter 22. The stator of the transmitter can be caused to follow and adjustment of the throttle lever by a followup circuit (loop) comprising the amplifier 20 and a servomotor 21. This followup circuit operates with a time constant which is adapted to the time constant of the engine.

Signal *d* effects the changeover of the blinking signals through signal gating devices 25 and 26, respectively, from a pair of blinking lamps associated with the trimming lever to a pair of blinking lamps associated with the throttle lever, depending on which lever must be operated to effect the correction of the turbine gas temperature in the respective mode of operation.

Another feature of the arrangement according to FIG. 4 is a multiplier element 29 by which, from a specific speed on the coefficient with which the influence of the barometric pressure $p_o$ at the summing amplifier 3 is taken into consideration, will be varied. This is done specifically in the modes of operation "takeoff" and "highest cruising power".

Figures 5, 6:
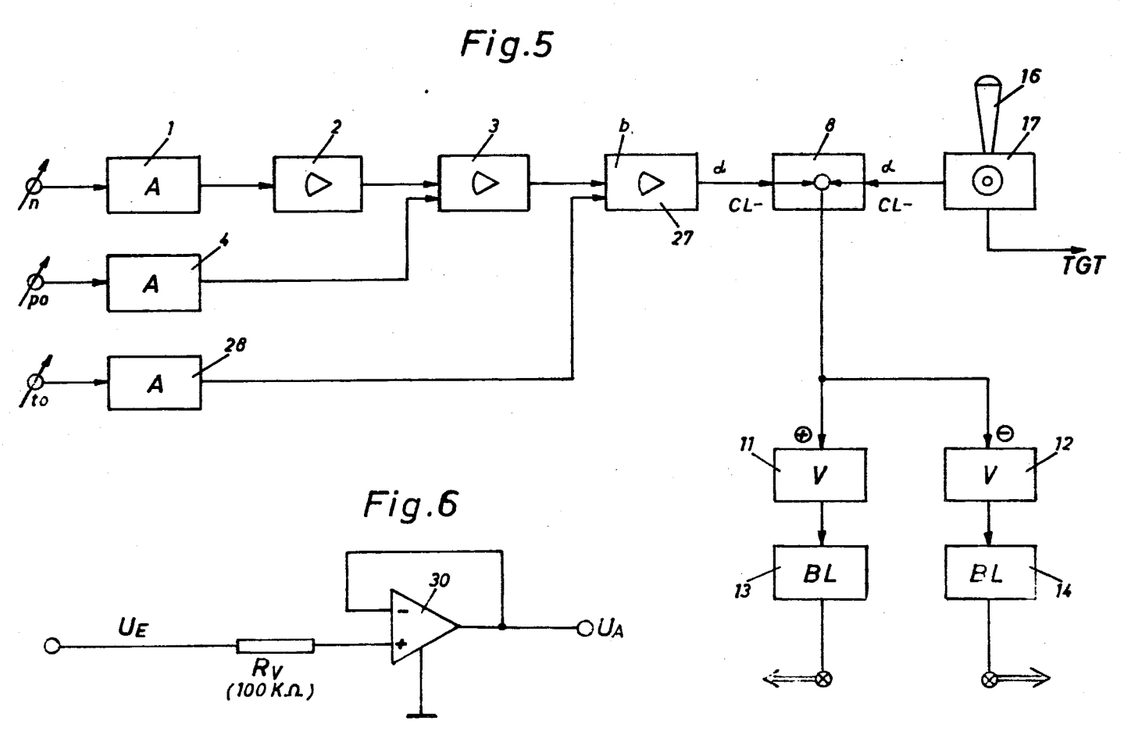
FIG. 5 is a block circuit diagram of an embodiment similar to that of FIG. 3 with the position of the trimming lever as regulating variable.
FIG. 6 illustrates an example of an adapter element applicable to the invention.

FIG. 5 is an illustration similar to that of FIG. 3, however, with an arrangement in which the position of the trimming lever signal $\alpha$ represents the regulating variable in accordance with the manner of FIG. 2. Like parts are referenced by the same reference numerals as in FIG. 3. The computer includes an additional multiplier element 27 to which is applied, on the one hand, the output of the adding amplifier 3 and, on the other hand, a signal which is supplied by a sensor for the air temperature $t_o$ through an adapter element 28. The output of the multiplier element is indicative of the setpoint value $\alpha_{set}$ for the position of the trimming lever. The position of the trimming lever 16 is picked off by a synchro 17 similar to FIG. 3. The output of the synchro 17 is connected as an actual value across the summation element 8 in opposition to the setpoint value $\alpha_{set}$. The summation element controls blinking devices 13 and 14, respectively, through electrical valves 11, 12 in dependence on the sign of the difference $\alpha_{act}-\alpha_{set}$. The blinking devices operate the respective lights to indicate if an adjustment of the trimming lever is required. Also with this arrangement, an automatic control of the position of the trimming lever can be effected instead.

The electronic elements used with the arrangements of FIGS. 1 to 5 are circuitries customary per se. For completion of the disclosure, a few embodied forms of such circuitries used herein shall be described hereinafter with reference to the FIGS. 6 to 16.

FIG. 6 shows an adapter element such as that referenced 1 and 4 in FIGS. 3 to 5. Such an adapter element should have, on the one hand, a high input resistance so that the load of the measured value transmitter is low. On the other hand, the measured value transmitter should be influenced only irrelevantly for safety reasons in case of short-circuit of the adapter element. The adapter element includes a high-amplifying operational amplifier 30 having one input (+) to which the voltage $U_E$ from the measured value transmitter (for instance $n$, $p_o$) is applied through a high resistor $R_{1'}$. For example, resistor $R_{1'}$ is 100 kiloohms. The output voltage $U_A$ is connected in opposition across the other input (−).

Figure 7:
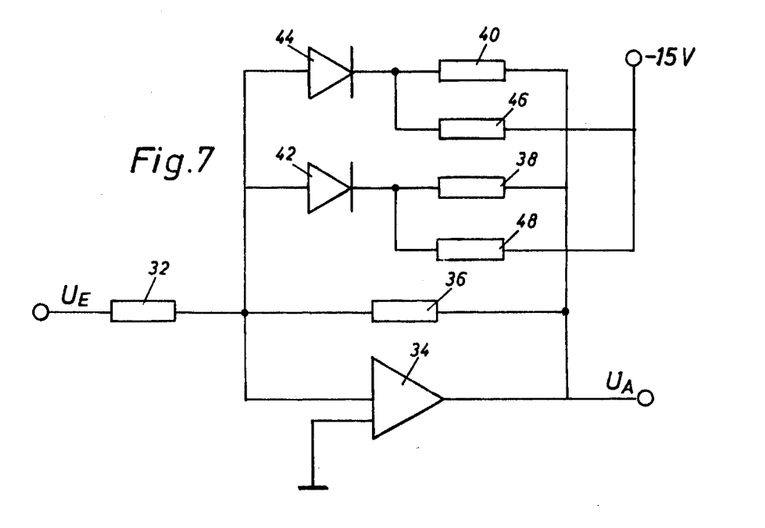
FIG. 7 illustrates an example of a function transmitter applicable to the invention for copying an empirically determined function.
Figure 8:
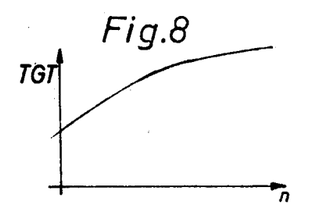
FIG. 8 illustrates an example of the function approximated by the function transmitter of the invention.

FIG. 7 illustrates schematically a function transmitter such as that referenced 2 in FIG. 3. It copies an empirically determined function, for instance one according to FIG. 8, by straight line portions; that is, the output voltage $U_A$ shall approximately depend on the input voltage $U_E$ modified according to this function. Within the range of each straight line portion, respectively, a linear relationship exists between $U_A$ and $U_E$.

For this purpose the input voltage $U_E$ is applied to an operational amplifier 34 through a resistor 32. From the output of the amplifier 34 a negative feedback is effected through resistors 36, 38, 40. The ratio of the resulting resistance value of the resistors 36, 38, 40 to the resistance value of the resistor 32 first determines the effective gain, thus the ratio of $U_A$ and $U_E$. The diodes 42, 44 in series with the resistors 38 and 40 respectively, are initially maintained conductive by a negative bias voltage of −15 volts applied through resistors 46, 48. With an increase in the input and output voltages $U_E$ and $U_A$, respectively, the diodes 44 and 42, respectively, are successively blocked, the point in which this occurs being determined by the relative resistance of the resistors. Accordingly, there are changes in the effective negative feedback resistor and the gain. Thus, the output voltage $U_A$ depends on the input voltage $U_E$ according to a broken line characteristic.

Figure 9:
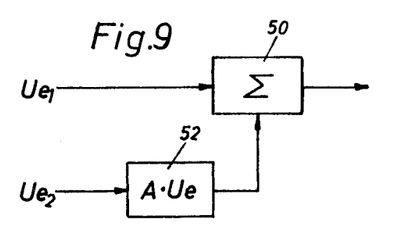
FIG. 9 illustrates an example of a calculating element used with the invention.

FIG. 9 illustrates an example of a computing element such as that referenced 3 in FIG. 3. It includes a summation element 50 and an operational amplifier 52 having a gain A. The summation element adds up an input voltage $U_{e1}$ and the output voltage of the amplifier 52. An input voltage $U_{e2}$ is applied to amplifier 52 and its output voltage is $A \cdot U_{e2}$. Thus, at summation element 50 there is an output voltage:

$$U_A = U_{e1} + A\, U_{e2}$$

Figure 10:
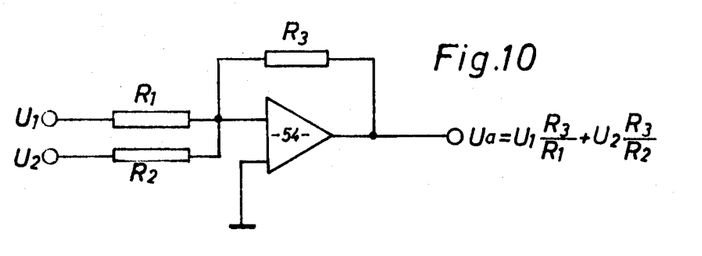
FIG. 10 illustrates an example of a summation element used with the invention.

FIG. 10 illustrates a summation amplifier as can be used, for example, for the element 8 in FIGS. 3 to 5. It includes a high-amplifying operational amplifier 54 to the input of which two input voltages $U_1$ and $U_2$ are applied through resistors $R_1$ and $R_2$, respectively. A negative feedback is effected through a resistor $R_3$. An output voltage is obtained as follows:

$$U_A = U_1(R_3/R_1) + U_2(R_3/R_2)$$

Figure 11:
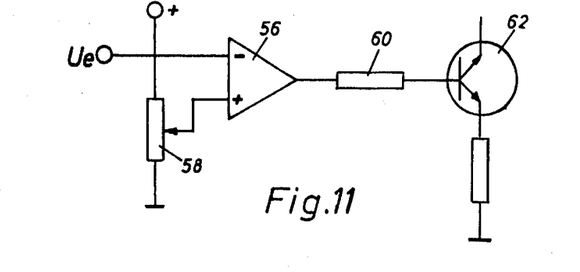
FIG. 11 illustrates an example of the "electrical valves" used with the invention.
Figure 12:
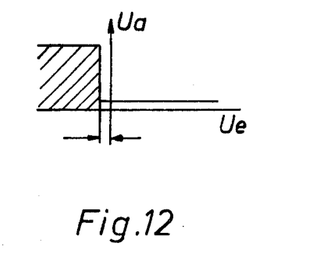
FIG. 12 illustrates the characteristic of the electrical valve of FIG. 11.

The electrical valves 11 and 12 of FIG. 3 or 4 may be designed in the manner of FIG. 11. To a operational amplifier 56 an input voltage $U_e$ is applied across an input (−). Across the other input (+) of the operational amplifier 56 is applied a voltage which is derived from an adjustable potentiometer 58 connected to a fixed DC voltage. The output of the operational amplifier 56 is applied to the base of a transistor 62 through a resistor 60. Depending on whether the input voltage $U_e$ is greater or smaller, when taken absolute, then the reference voltage derived from the potentiometer 53, the transistor 62 is controlled through or is blocked. The adjustable potentiometer 58 makes it possible to adjust the threshold at which the "electrical valve" opens, thus (in FIG. 3) the dead range in which no correction signal is yet supplied with a deviation of actual value and command value.

The electrical valve 15 of FIG. 3 is of a different type and is actually a multiplier element. It provides that a first input signal (for instance, $\Delta\alpha$ in FIG. 3) has substantially the same waveform with respect to time as does another signal $\Delta T$. For this purpose, an oscillator 64 (FIG. 13) is provided which has a frequency controllable as a function of $\Delta T$. The oscillator 64 controls choppers 66 and 68 for the signal $\Delta T$ and for the signal $\Delta\alpha$, respectively. The chopped signals are supplied to a summing element 10.

Figure 13:
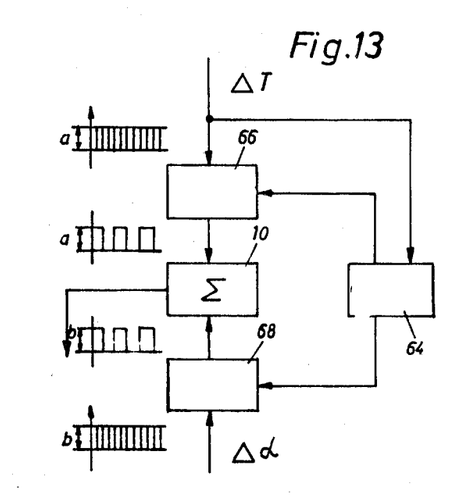
FIG. 13 illustrates another form of "electrical valve" which is applicable to the invention.
Figure 14:
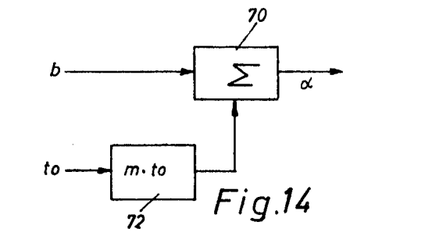
FIG. 14 illustrates a multiplier applicable to the invention.
Figure 15:
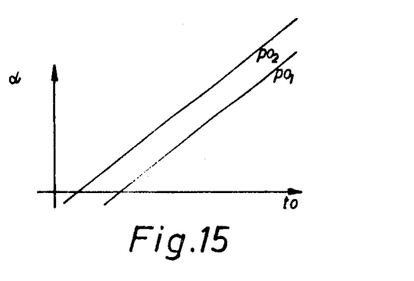
FIG. 15 illustrates the functions which can be simulated with the multiplier of FIG. 14.

Thereby, pulses of constant width are supplied to the summation element at a frequency dependent on $\Delta T$. In the summing element 10, the chopped signals are connected in opposition. As an output signal from the summing element, the mean value of the resulting signal is used which consists of a pulse sequence of an amplitude $(\Delta T - \Delta\alpha)$ and a frequency dependent on $\Delta T$. If $\Delta T$ approaches zero, the output signal also approaches zero, since the pulse frequency decreases to zero, and that is independently of the actual signal difference ($\Delta T - \Delta \alpha$). Of course, the output signal is also zero if $\Delta T = \Delta \alpha$. This circuit permits the compensation of differences in the time course of the deviation $\Delta T$ and the feedback of the trimming lever signal through the followup circuit 17, 18, 19 (FIG. 3).

The multiplier 27 in FIG. 5 serves to form an expression for the proposition that:

the position of the trimming lever = $mt_o + b$. It includes a summation element 70 (FIG. 14) and an amplifier element 72. The summation element has applied thereto on the one hand the signal $b$ and on the other hand the output of the amplifier element 72. The amplifier element 72 amplifies—and thereby multiplies—the temperature signal applied thereto by a factor $m$, so that its output is $m \cdot t_o$. The output of the summation element 70 supplies the above expression ($mt_o + b$) for the position of the trimming lever. Since $b = f(p_o)$, the dependence of the output signal $\alpha_{set}$ on $t_o$ obvious from FIG. 15, results for different $p_o$.

Figure 16:
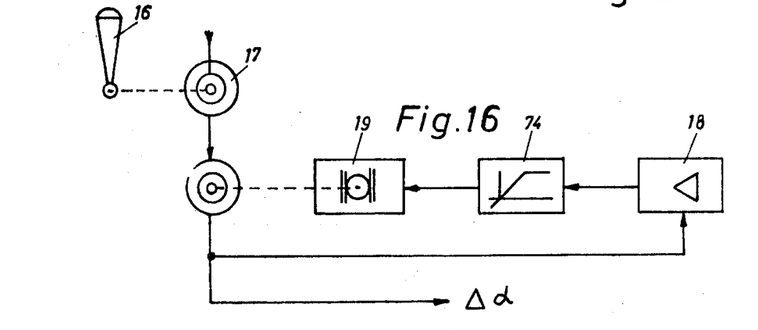
FIG. 16 is a detailed illustration of the followup system for the trimming lever and the throttle lever, respectively.

The followup system of the trimming lever is shown in FIG. 16. The same arrangement would be employed for the followup system for the throttle lever A synchro 17 is connected to the trimming lever 16. The armature of synchro 17 is rotatable with the trimming lever and is fed with a constant voltage excitation. The stator of the synchro 17 is connected with the stator of a second synchro 17'. The armature of the synchro 17' supplies the output signal $\Delta \alpha$. This armature can be rotated to follow by the output signal $\Delta \alpha$ through an amplifier 18 and a time element 74 through a servomotor 19.

I claim:

1. In an aircraft apparatus for use in controlling a propeller turbojet engine having a variable position throttle lever for establishing an engine setting for a mode of operation of the aircraft and a variable position trimming lever for establishing an optimum value of turbine gas temperature for the mode of operation and for selected variable factors which may include speed, air pressure, cruising altitude and air temperature, the improvement comprising:

sensor means responsive to the selected factors for producing input signals as a function of said selected factors;

computer means connected to said sensor means to respond to said input signals for producing a trimming lever setpoint signal indicative of said optimum value of turbine gas temperature;

additional sensor means connected to the engine for producing an actual setting signal which is a function of the actual setting of the trimming lever; and responsive means connected to said additional sensor means and to said computer means for producing a response indicative of the direction of deviation of the deviation, if any, between the actual setting signal and the setpoint signal.

2. In an apparatus as set forth in claim 1, wherein said computer means comprises:

function transmitter means connected to receive one of said input signals for modifying said one input signal according to a predetermined function to produce a modified input signal; and adding amplifier means for producing said setpoint signal as a function of said modified input signal and the other of the input signals.

3. In an apparatus as set forth in claim 2, wherein the sensor means producing said one input signal is responsive to engine speed and the sensor means producing said other signal is responsive to air pressure.

4. In an apparatus as set forth in claim 3, wherein said computer means comprises multiplier means effective at speeds in excess of a predetermined value for changing the effect of said other signal in said adding amplifier means.

5. In an apparatus as set forth in claim 4 including switch means connected to the throttle lever and to the amplifier means for suppressing the effect of said other signal when the throttle lever is in a predetermined range.

6. In an apparatus as set forth in claim 5, wherein the responsive means produces an error signal as a function of the magnitude of deviation and including means connected to the trimming lever for producing a gentle feedback signal of the displacement of the trimming lever and connected to the responsive means for applying said feedback signal in opposition to the error signal.

7. In an apparatus as set forth in claim 6, wherein said responsive means includes two visual indicators, one indicator becoming effective when the deviation is of one sign and the other becoming effective when the deviation is of the opposite sign.

8. In an apparatus as set forth in claim 6, wherein said responsive means is connected to said trimming lever to automatically adjust the latter to eliminate the deviation, if any.

9. In an apparatus as set forth in claim 2, wherein said computer comprises multiplier means effective at speeds in excess of a predetermined value for changing the effect of said other signal in said adding amplifier means.

10. In an apparatus as set forth in claim 2,
wherein a sensor means is responsive to air temperature for producing a temperature responsive signal;
said computer apparatus including multiplier means connected to said air temperature responsive sensor means for multiplying the output of the adding amplifier means with said temperature responsive signal to produce said setpoint signal.

11. In an apparatus as set forth in claim 1, including control means connected to said throttle and said computer means for producing, in response to engine speeds above a given value, an output setpoint signal from said computer means which is a function only of the throttle lever setting.

12. In an apparatus as set forth in claim 11, wherein the responsive means produces an error signal as a function of the magnitude of deviation and including means connected to the throttle lever for producing a gentle feedback signal of the displacement of the throttle lever and connected to the responsive means for applying said feedback signal in opposition to the error signal.

13. In an apparatus as set forth in claim 1, wherein said additional sensor means is responsive to the turbine gas temperature of the engine.

14. In an apparatus as set forth in claim 1, wherein said additional sensor means is connected to the trimming lever to be directly affected by the position of the trimming lever.

* * * * *